United States Patent
Carnevali

(10) Patent No.: US 7,431,251 B2
(45) Date of Patent: Oct. 7, 2008

(54) MAGNETIC MOUNTING PLATFORM

(76) Inventor: Jeffrey D. Carnevali, 3262 - 36th Ave. SW., Seattle, King County, WA (US) 98126

( * ) Notice: Subject to any disclaimer, the term of this patent is extended or adjusted under 35 U.S.C. 154(b) by 0 days.

(21) Appl. No.: 10/402,064

(22) Filed: Mar. 27, 2003

(65) Prior Publication Data

US 2004/0188576 A1  Sep. 30, 2004

(51) Int. Cl.
*A47G 1/17* (2006.01)
(52) U.S. Cl. .................. 248/206.5; 248/309.4; 248/683; 224/183; 379/446; 379/454; 379/455
(58) Field of Classification Search ............. 248/206.5, 248/683, 467, 309.4, 205.1; 224/183, 562; 379/446, 454, 455
See application file for complete search history.

(56) References Cited

U.S. PATENT DOCUMENTS

| | | | | |
|---|---|---|---|---|
| 2,414,653 A | * | 1/1947 | Iookholder | 335/285 |
| 4,319,097 A | * | 3/1982 | Liautaud | 381/365 |
| 5,025,966 A | * | 6/1991 | Potter | 224/183 |
| 5,189,744 A | * | 3/1993 | Roberts | 5/497 |
| 5,213,240 A | * | 5/1993 | Dietz et al. | 224/183 |
| 5,221,006 A | * | 6/1993 | Plumlee et al. | 206/350 |
| 5,405,004 A | * | 4/1995 | Vest et al. | 206/350 |
| 5,687,945 A | * | 11/1997 | Lee | 248/442.2 |
| 5,895,018 A | * | 4/1999 | Rielo | 248/206.5 |
| 5,992,807 A | | 11/1999 | Tarulli | |
| 6,076,790 A | * | 6/2000 | Richter | 248/206.5 |
| 6,135,408 A | | 10/2000 | Richter | |
| 6,149,116 A | | 11/2000 | Won | |
| 6,293,509 B1 | * | 9/2001 | Richter | 248/309.4 |
| 6,502,727 B1 | * | 1/2003 | Decoteau | 224/162 |
| 6,553,626 B2 | * | 4/2003 | Coburn | 16/386 |
| 6,739,567 B1 | * | 5/2004 | Curtis | 248/548 |
| 6,888,940 B1 | * | 5/2005 | Deppen | 379/446 |
| 2002/0003874 A1 | * | 1/2002 | Peiker | 379/419 |

* cited by examiner

*Primary Examiner*—Kimberly T. Wood
(74) *Attorney, Agent, or Firm*—Charles J. Rupnick

(57) ABSTRACT

A magnetic mounting platform assembly for removably retaining handheld devices using magnetic attraction. The magnetic mounting platform assembly provides a substantially flat support surface backed by an interface structure that secures the magnetic mounting platform assembly to an external mounting surface. A permanent magnet is disposed within a cavity that positions magnet in close proximity to the flat support surface. According to one embodiment of the invention, the interface structure also captures and secures the magnet between the pad and the mounting surface.

20 Claims, 4 Drawing Sheets

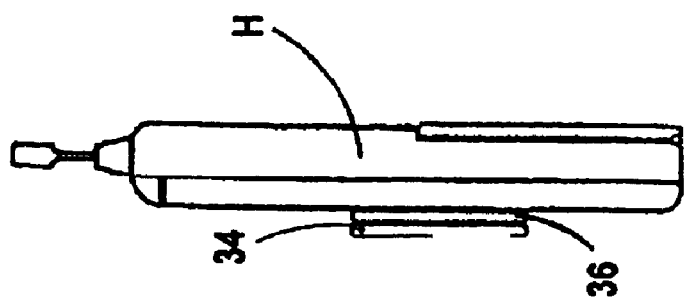
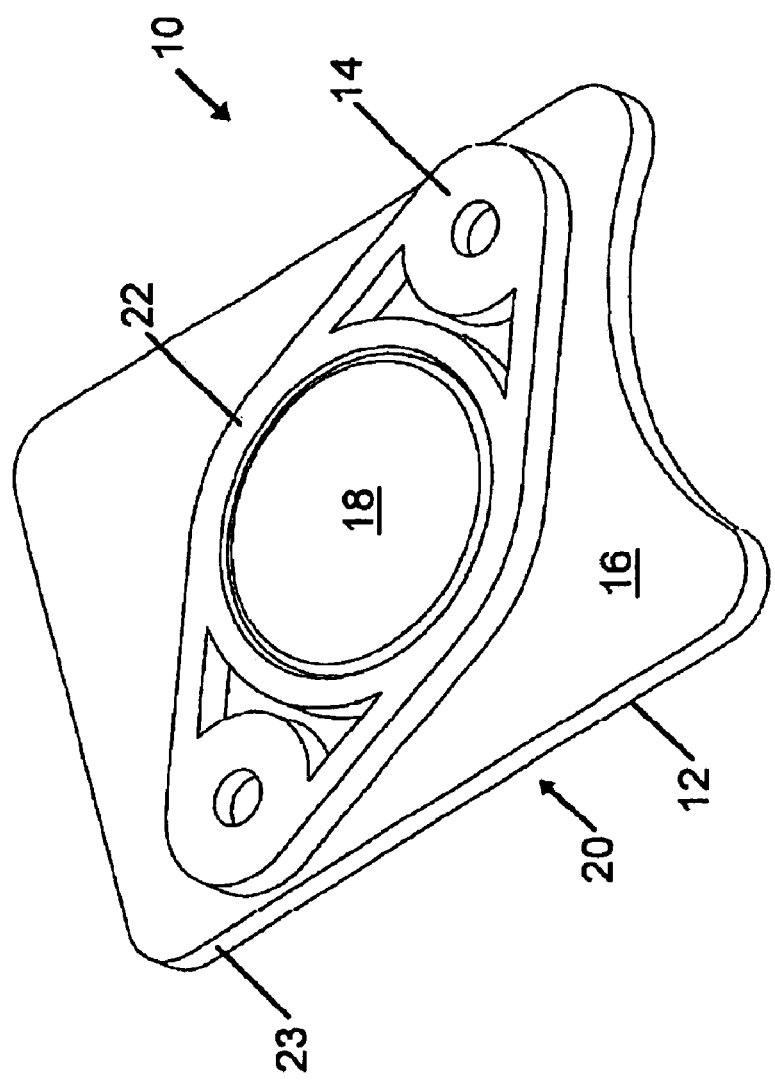

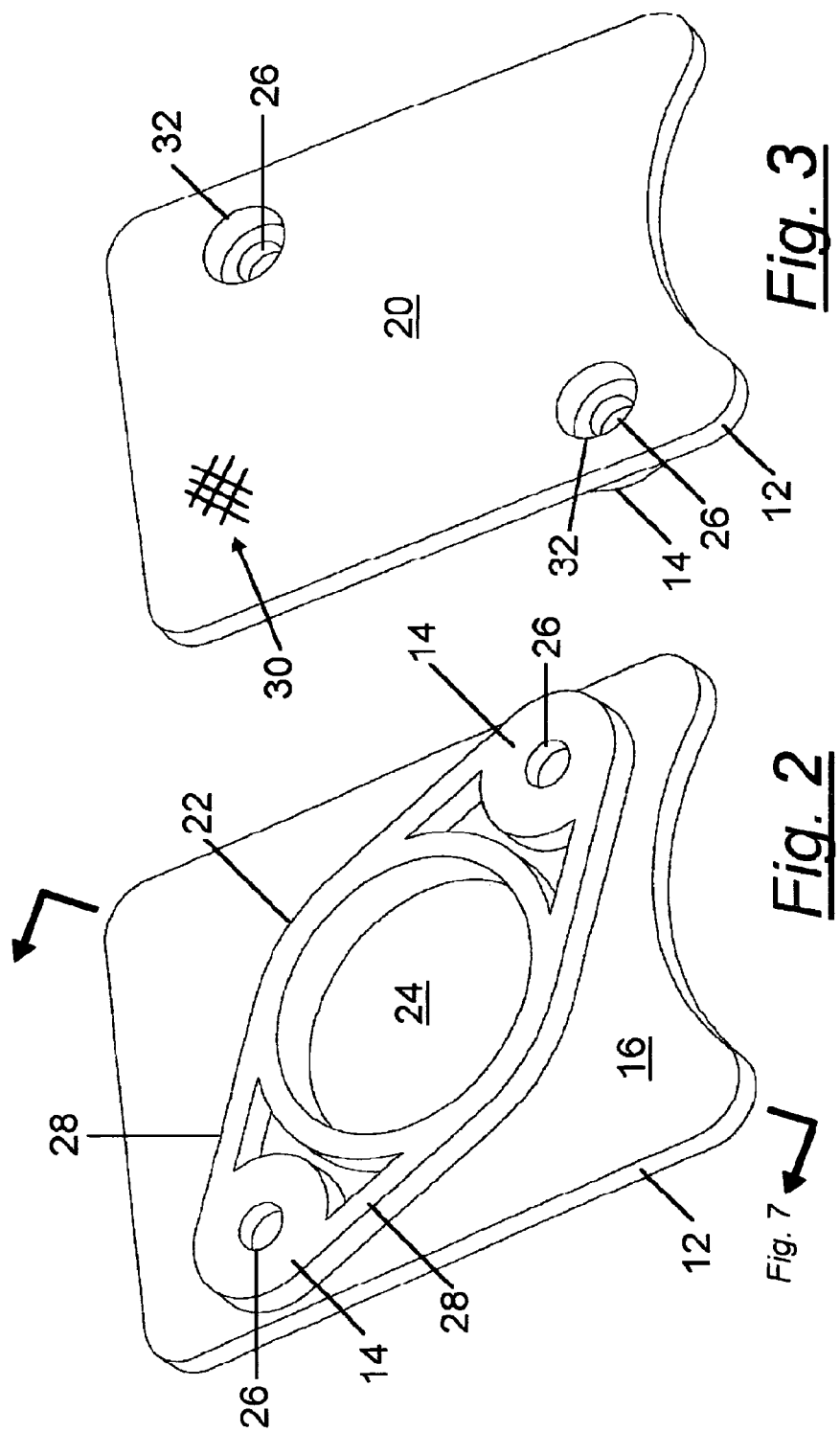

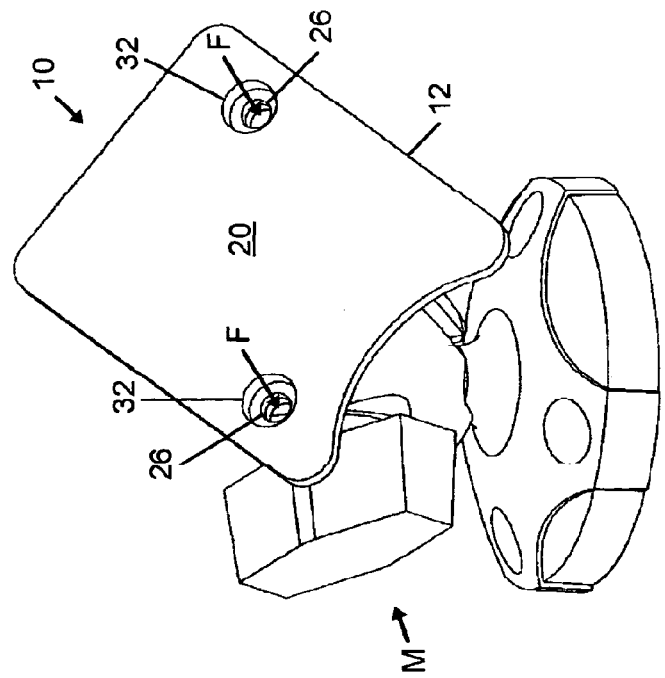
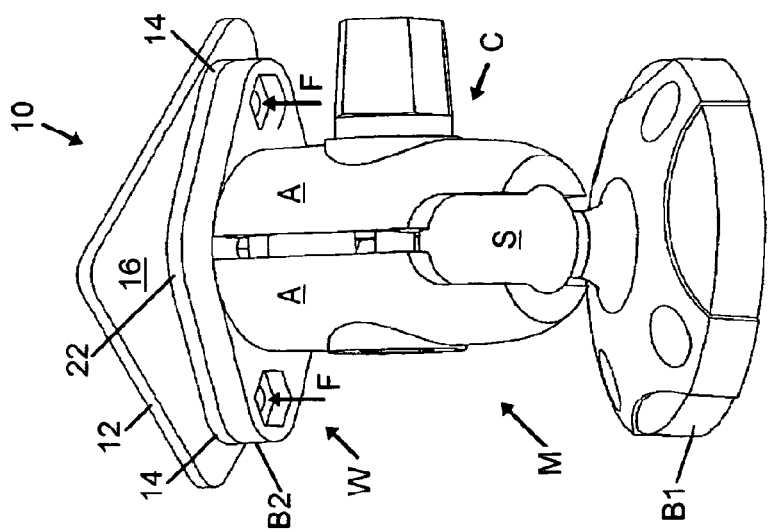

MAGNETIC MOUNTING PLATFORM

FIELD OF THE INVENTION

The present invention relates to the field of device mounting platforms, and in particular to handheld device mounting platforms operable by means of magnetic attraction.

BACKGROUND OF THE INVENTION

Mounting platforms for handheld devices and other small articles operable by means of magnetic attraction are generally well-known. Several of these magnetic mounting platforms are known for supporting handheld cell phones on the dashboard of an automobile. One example is shown in U.S. Pat. No. 5,992,807 entitled, UNIVERSAL MAGNETIC STAND FOR CELL PHONES, issued to Tarulli on Nov. 30, 1999, which is incorporated herein by reference, which describes a magnet that is permanently secured to the dashboard. Attraction between the magnet and metal parts normally found in the cell phone cause the cell phone to be removably retained on the dashboard so that it may be lifted off manually and manually replaced on the magnet. A rubber layer is provided on the magnet's front face as frictional resistance to prevent the cell phone from slipping.

In another example, U.S. Pat. No. 6,135,408 entitled, MOBILE TELEPHONE HOLDER, issued to Richter on Oct. 24, 2000, which is incorporated herein by reference, describes a holder for a mobile telephone having a housing with a permanent magnet disposed adjacent to a front wall of the holder, with a iron plate between the magnet and a rear wall of the holder for increasing the magnetic forces generated by the magnet by providing a path for the magnetic force lines. The rear wall of the housing includes a number of engagement openings that act as mounting structure for mounting the holder on a vehicle dashboard. The front wall of the holder is structured with a recess opposite the magnet. An iron plate shaped to fit into the recess is adhesively attached to the mobile phone, and the mobile phone is thereby removably retained on the dashboard by the magnetic holder.

U.S. Pat. No. 6,149,116 entitled, HOLDER FOR MOBILE TELEPHONE, issued to Won on Nov. 21, 2000, which is incorporated herein by reference, describes still another mobile telephone holder having a magnet and a piece of iron attachable to the back of the mobile telephone and attachable to the magnet by magnetic force. A pair of independently moveable hinge-connected supports provide an angle-controllable attachment supporting means for attaching the main body of the holder to the surface of a vehicle dashboard.

These and other known magnetic mounting platforms each suffer limitations that limit their usefulness as mounting platforms for handheld devices in modern automobiles and other modern vehicles.

SUMMARY OF THE INVENTION

An apparatus for removably retaining handheld devices by means of magnetic attraction that overcomes limitations of the prior art by providing a substantially flat support surface backed by an interface structure that operates as means for securing the magnetic mounting platform assembly to an external mounting surface. A permanent magnet is disposed within a cavity that positions magnet in close proximity to the flat support surface. According to one embodiment of the invention, the interface structure also operates as means for capturing and securing the magnet between the pad and the mounting surface.

Accordingly, the present invention provides a magnetic mounting platform assembly, including a pliant support pad formed of an elastomeric material having a relatively high coefficient of friction, the support pad having first and second opposing sides, the first side being formed as a support surface and the second side being formed as a backing surface; a rare-earth type permanent magnet; a magnet retention means formed on the backing surface for retaining the magnet, the magnet retention means being formed as an annular ring sized to accept the magnet under at least a light pressure; and an interface means formed on the backing surface for mounting the support pad on an external mounting surface with the support surface facing away from the external mounting surface, the interface means being formed with an aperture structured to accept a fastener and having a recess formed on the first side of the support pad and structured to position a fastener below the support surface of the support pad.

According to one aspect of the invention, the magnetic mounting platform assembly of the invention provides a portion of magnetically attractive material, such as a sheet or plate of ferrous metal, distinct from the support pad and coupled to an external device to be supported. The magnet field generated by the permanent magnet being sufficiently powerful that the electronic device is removably retained against the support pad by magnetic attraction of the portion of magnetically attractive material.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 illustrates the magnetic device mounting platform assembly of the invention embodied as a thin two-sided pad of pliant elastomeric material having both an interface structure and a magnet retention structure projecting from a backing surface with a magnet positioned by the magnet retention structure in close proximity to an opposed support surface of the two-sided pad such that the distance between the magnet and the support surface is minimized;

FIG. 2 shows the two-sided pad of pliant elastomeric material having the magnet retention structure embodied as an annular ring of the elastomeric material projecting from the backing surface in a position to place the magnet at the approximate center of the pad, FIG. 2 also illustrates the interface structure portion of the magnetic mounting platform embodied as a pair of bosses projecting from the backing surface of the pad with each of the bosses being pierced with an aperture sized to pass a fastener appropriate for attaching the magnetic platform assembly to an intermediate mounting device, as illustrated in FIGS. 4 and 5;

FIG. 3 shows the support surface embodied as a substantially smooth or optionally "roughened" surface opposite from the backing surface and having one or more recesses coincidental with the fastener apertures for recessing the fastener below the support surface so as not to interfere with support of a handheld device by the magnetic mounting platform assembly;

FIG. 4 illustrates the magnetic mounting platform assembly of the invention as embodied in FIGS. 1-3 being installed on an exemplary an intermediate mounting device embodied as a universally positionable mounting device of a type known in the prior art;

FIG. 5 is another view of the assembly illustrated in FIG. 4 that illustrates the magnetic mounting platform assembly of the invention as embodied in FIGS. 1-3 being installed on a universally positionable mounting device of a type known in the prior art;

FIG. 6 illustrates the use of thin sheet or plate of ferrous material that is optionally provided on the handheld device to enhance magnetic attraction when the handheld device is removably mounted on the magnetic mounting platform assembly of the invention.

DETAILED DESCRIPTION OF PREFERRED EMBODIMENT

Figure 7:
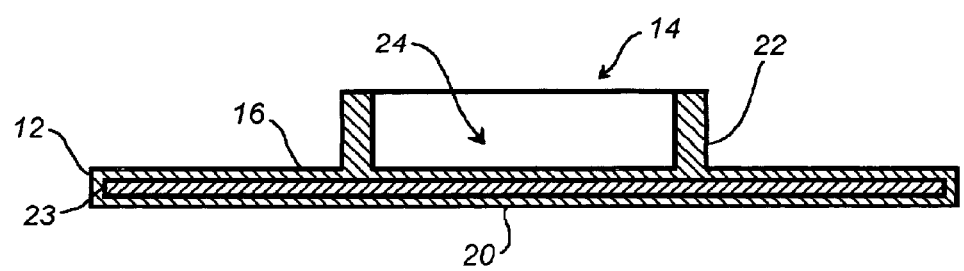
FIG. 7 is a sectional view taken through the magnetic mounting platform assembly of the invention as illustrated in FIG. 2 and illustrates the thin sheet or plate of ferrous material that is optionally provided as part of the pliant support pad of the magnetic mounting platform assembly of the invention.

In the Figures, like numerals indicate like elements.

The present invention is an apparatus for removably retaining handheld devices by means of magnetic attraction. The magnetic mounting platform of the invention provides a substantially flat support surface backed by an interface structure that operates as means for securing the magnetic mounting platform assembly to an external mounting surface. A permanent magnet is disposed within a cavity that positions magnet in close proximity to the flat support surface. According to one embodiment of the invention, the interface structure also operates as means for capturing and securing the magnet between the pad and the mounting surface.

According to one embodiment of the invention, the flat support surface is embodied as a thin support pad of pliant elastomeric material that is sufficiently flexible to conform to device surfaces having a non-planar contour as is common with modern handheld electronic devices such as cellular phones, GPS (global position system) receivers, two-way radios, pager/messaging devices, Personal Digital Accessories (PDAS) and other handheld or "mobile" electronic devices. As is well-known and supported at least by Tarulli in above incorporated U.S. Pat. No. 5,992,807, the battery packs that power cellular phones and other handheld electronic devices are magnetically attractive. These devices are generally powered by nickel cadmium or hydrated metal nickel type batteries which have a ferromagnetic metal casing that is inherently magnetically attractive. The batteries are typically protected only by a thin plastic cover that does little to attenuate the magnetic field generated by the mounting platform's permanent magnet. When the magnet field is sufficiently powerful, the electronic device is removably retained by magnetic attraction of the batteries.

The battery pack also serves to protect the device during operation. The magnetic field generated by the magnet 18 is contained within the ferromagnetic metal casing which thereby prevents the magnetic field from interfering with electronic circuits within the device.

When magnetic attraction of the batteries is insufficient to securely retain the device, or the device is not battery-powered and does not include an other ferromagnetic metal portion sufficient to securely retain the device, a thin sheet or plate of ferrous material is optionally provided on the device to enhance magnetic attraction. For example, a thin sheet or plate of iron or magnetic steel is attached by means of a strong bi-adhesive tape to an external surface of the device.

FIG. 1 illustrates the magnetic device mounting platform assembly 10 of the invention embodied by example and without limitation as a thin two-sided support pad 12 of pliant elastomeric material having an interface structure 14 projecting from a backing surface 16 and operating to secure the magnetic mounting platform assembly 10 to an external mounting surface. A magnet 18 is positioned on the backing surface 16 in close proximity to an opposed support surface 20 (shown more clearly in subsequent Figures). According to one embodiment of the invention, the interface structure 14 also operates as means for capturing and securing the magnet between the support pad 12 and the external mounting surface. The thinness of the two-sided support pad 12 minimizes the distance between the magnet 18 and the support surface 20. Attenuation of the magnetic field generated by the magnet 18 and the support surface is thereby minimized and the magnetic field remains sufficiently powerful to ensure retention of most handheld electronic devices by magnetic attraction to either the device batteries or another ferrous component.

The magnet 18 is sized and shaped to be retained by a retention structure 22 projecting from the backing surface 16. The magnet 18 and retention structure 22 are sized to inhabit a substantial portion of the support pad 12. The magnet 18 is by example and without limitation a thin round or disk-shape. Although the disk shape is convenient, other magnet shapes are equivalent and maybe substituted. The magnet 18 is of the well-known rare-earth variety. Examples of rare-earth magnets are given in U.S. Pat. No. 6,527,971 entitled, RARE-EARTH BONDED MAGNET, RARE-EARTH BONDED MAGNET COMPOSITION AND METHOD OF MANUFACTURING THE RARE-EARTH BONDED MAGNET, issued to Nakamura, et al. on Mar. 4, 2003; U.S. Pat. No. 6,527,874 entitled, RARE EARTH MAGNET AND METHOD FOR MAKING THEM IN THEM SAME, issued to Li on Mar. 4, 2003; and U.S. Pat. No. 6,399,150 entitled, RARE-EARTH METAL-BASED PERMANENT MAGNET, AND PROCESS FOR PRODUCING THE SAME, issued to Yoshimura, et al. on Jun. 4, 2002, all incorporated herein by reference, as well as many others. Rare-earth magnets are very powerful in proportion to size and are therefore useful in practice of the present invention. However, other known and presently unknown magnets that are sufficiently powerful for practice of the invention are equivalent and may be substituted.

According to one embodiment of the invention, the pliant support pad 12 of elastomeric material of the magnetic platform assembly 10 includes means for expanding the magnetic field generated by the magnet 18. Accordingly, as also shown in FIG. 7, a thin sheet or plate 23 of ferrous material is optionally provided as part of the pliant support pad 12. By example and without limitation, the thin sheet 23 of ferrous material is embedded within the elastomeric material, i.e. over molded, when the support pad 12 is molded. The close proximity of the magnet 18 causes the magnetic field lines to enter the ferrous material which provides a path for the lines of magnetic force to spread throughout the sheet 23. The magnetic field within the magnetic platform assembly 10 is thereby expanded over substantially the entire footprint defined by the support pad 12.

FIG. 2 illustrates the magnet retention structure 22 projecting from the backing surface 16 in a position to place the magnet 18 at the approximate center of the support pad 12. According to one embodiment of the invention, the magnet retention structure 22 is embodied as an annular ring defining a cavity having a floor or base 24 spaced away from the support surface 20 only by the minimal thickness of the thin support pad 12, whereby the magnet 18 is retained in close proximity to the support surface 20 such that attenuation of the magnetic field is minimized in the vicinity of the support surface 20. The magnet 18 and magnet retention structure 22 are matched in size to interfere such that the magnet 18 is inserted into the retention structure 22 under at least light pressure and as much as a press fit, whereby the magnet 18 is retained having one of its disk-shaped surfaces in intimate contact with the floor 24 of the retention structure 22.

The support pad 12, interface structure 14 and magnet retention structure 22 are optionally combined in a single integral structure molded out of a pliant elastomeric material. When molded or otherwise formed out of a pliant elastomeric material, the annular retention structure 22 is sized to match the outside diameter of the magnet 18 such that any light pressure is used to push the disk surface of the magnet 18 into contact with the floor 24, and the walls of the retention structure 22 close in annular compression about the magnet outer diameter thereby maintaining the intimate contact between the magnet 18 and the floor 24. Other retention means are avoided such as bi-adhesive tape as taught by both Tarulli in U.S. Pat. No. 5,992,807 and Won in U.S. Pat. No. 6,149,116 or the bayonets in mating apertures as taught by Rielo in U.S. Pat. No. 5,895,018 entitled, MAGNETIC SUPPORT ATTACHMENT, issued Apr. 20, 1999, which is incorporated herein by reference. Rather, the magnet 18 is retained by radial compression of the retention structure 22 has an inherent property of the pliant elastomeric material of which it is formed.

The pliant elastomeric material is for example a conventional material such rubber or plastic as is well-known for use in the manufacture of suction cups. The pliant elastomeric material is by example and without limitation a rubber such as gum rubber, a plastic such as soft vinyl plastic resin or PVC (polyvinyl chloride), or another material with similar elastically resilient properties. The elastomeric material is also selected to exhibit a relatively non-slip at the support surface 20 to prevent relative slipping of the very smooth plastic surfaces typical of the handheld electronic devices. One example of such pliant elastomeric material is given in U.S. Pat. No. 6,666,420 entitled, SUCTION CUP HAVING COMPACT AXIAL INSTALLATION AND RELEASE MECHANISM, issued to the inventor of the present invention on Dec. 23, 2003, which is incorporated herein by reference. Other examples of pliant elastomeric materials useful in practicing the invention are given in U.S. Pat. No. 5,029,786 entitled, SUCTION CUP, issued to Wu on Jul. 9, 1991; U.S. Pat. No. 6,375,143 entitled, RELEASABLE SUCTION CUP, issued to Burns on Apr. 23, 2002; U.S. Pat. No. 4,934,641 entitled, CURVED SURFACE SUCTION MOUNTING APPARATUS, issued to McElhaney on Jun. 19, 1990; U.S. Pat. No. 5,087,005entitled, TWIST-CAM SUCTION CUP ASSEMBLY, issued to Holoff, et al. on Feb. 11, 1992; and U.S. Pat. No. 5,381,990 entitled, RELEASABLE SUCTION CUP ASSEMBLY, issued to Belokin, et al. on Jan. 17, 1995, all incorporated herein by reference, as well as many others. However, other known and presently unknown conventional elastomeric materials are sufficiently pliant for practice of the invention are equivalent and may be substituted.

Another inherent property of such elastomeric materials is a slightly viscous or "sticky" surface that, when used in the manufacture of the support pad 12, provides a support surface 20 (shown in FIG. 3) having a desirable relatively high coefficient of friction that prevents sliding when the cellular phone or other device has a slick plastic surface. In other words, the pad material is selected to provide a relatively non-slip support surface 20.

Furthermore, the pliancy of the support pad 12 formed out of such an elastomeric material is sufficiently flexible to permit the support surface 20 to conform to non-planar contours as are typical of modern handheld electronic devices such as cellular phones, GPS (global position system) receivers, two-way radios, pager/messaging devices, Personal Digital Accessories (PDAs) and other handheld or "mobile" electronic devices.

FIG. 2 also illustrates one means for securing the assembly 10 to an external mounting surface with the support surface facing away from the external mounting surface and the magnet captured between the support pad and the mounting surface. Accordingly, the interface structure 14 embodied as a pair of bosses projecting from the backing surface 16 of the support pad 12.

The interface structure 14 means for securing the assembly 10 to an external mounting surface is embodied as each of the bosses being pierced with an aperture 26 that is sized to pass therethrough a fastener appropriate for attaching the platform assembly 10 to an external mounting surface such as an intermediate mounting device, as discussed herein.

According to one embodiment of the invention, pairs of the ribs 28 interconnect the interface structure 14 and magnet retention structure 22, thereby slightly stiffening the thin support pad 12.

Alternatively, one or more fasteners is optionally integrated with the support pad 12. For example, the heads of a pair of threaded studs are embedded in the molded structure of the pad 12 with their threaded shafts projecting out of the backing surface 16 so as to be inserted through matching apertures in an external mounting surface and secured with nuts. In such instance the apertures 26 are filled with the fasteners' threaded shafts. Furthermore, the support surface 20 shown in FIG. 3 is optionally left completely unbroken.

FIG. 3 shows the support surface 20 being opposite from the backing surface 16. The support surface 20 is substantially smooth or optionally includes any ribbed, knobbed, marbled, knurled or otherwise "roughened" surface texture 30 of a type well-known as useful for raising the surface frictional coefficient for better preventing sliding of a smooth surfaced device.

When the support pad 12 is secured using discrete fasteners passed through the apertures 26 into an external mounting surface, the support surface 20 is structured to include recesses 32 coincidental with the fastener apertures 26 for recessing the fasteners below the support surface 20. The recesses 32 are of sufficient depth that the recessed fasteners do not interfere with support of a handheld device by the mounting platform assembly 10. The support pad 12 thus presents a substantially solid support surface 20 that is broken only by the fastener apertures 26 and coincident fastener recesses 32. However, the support pad 12 and support surface 20 are illustrated only by example and without limitation as having a generally unbroken rectangular shape; other square, round, oblong, kidney and freeform shapes are suitable and result in an equivalent structure.

FIG. 4 illustrates the magnetic device mounting platform assembly 10 of the invention as embodied in FIGS. 1-3 and being installed on an exemplary universally positionable mounting device (designated "M") of a type known in the prior art. Such universally positionable mounting devices typically include a base "B1" structured for mounting on any surface such as an automobile or airplane dashboard or in the cockpit of a marine vessel. One such universal mounting device includes by example and without limitation a resiliently compressible spherical ball "S" and a mating split-arm socket assembly "A-A" with a clamping element "C" for securing the ball and socket structure in a desired arrangement. A positively positionable wheel-and-axle structure "W" is rotatable relative to the split-arm assembly A-A. The wheel-and-axle structure W is mounted on a second base "B2" that is structured to mate with the interface structure 14 of the magnetic platform assembly 10 and simultaneously cover the retention structure 22. The base B2 thereby captures the magnet 18 within the retention structure 22 when fasteners "F" are installed between the base B2 and each of the fastener apertures 26 in the interface structures 14 to secure the support pad 12. Mounting of the magnetic platform assembly 10 to the base B2 of the universal mounting device M thus provides a universally positionable magnetic mounting platform while simultaneously further eliminating the additional or auxiliary magnet retention means required by the prior art magnetic mounting platforms. An example of such a universally positionable mounting device M is described in allowed U.S. Pat.No. 6,561,476 entitled, POSITIVELY-POSITIONABLE MOUNTING APPARATUS, issued to the inventor of the present invention May 13, 2003, which is incorporated herein by reference.

FIG. 5 illustrates the magnetic mounting platform assembly 10 of the invention as embodied in FIGS. 1-3 in combination with a universally positionable mounting device M of the type described in FIG. 4. As illustrated in FIG. 5, the magnetic platform assembly 10 is coupled to the universally positionable mounting device M by one or more fasteners F that are passed through the one or more apertures 26 in the support pad 12 and interface structures 14 and secured to the second base B2. When the optional recesses 32 are present, the fasteners F are recessed below the support surface 20 to avoid interference with a cellular phone or other handheld device removably retained by proximity to the magnet 18.

The two-hole diamond shape of the interface structure 14 illustrated is not intended to be exhaustive and is shown as only one example and without limitation. The interface structure 14 is optionally embodied in any useful configuration. For example, the device interface structure 14 is embodied suitably for mounting the resiliently compressible ball-shaped coupler described in U.S. Pat. No. 5,845,885, entitled UNIVERSALLY POSITIONABLE MOUNTING DEVICE, issued Dec. 8, 1998, to the inventor of the present invention, which is incorporated herein by reference. Alternatively, the interface structure 14 is embodied suitably for mounting either of the male and female mounting bases for use in combination with the flexible snap-link apparatus disclosed in U.S. patent application Ser. No. 09/654,245, entitled FLEXIBLE ELECTRONIC MOUNT APPARATUS, filed Sep. 2, 2000, in the name of the inventor of the present invention, which is incorporated herein by reference. Other alternative embodiments of the interface structure 14 are also contemplated for mounting to a variety of different useful mounting devices.

FIG. 6 illustrates the use of portion 34 of ferrous material embodied by example and without limitation as a thin sheet or plate that is optionally provided on the handheld device (designated "H") to enhance magnetic attraction. For example, the ferrous sheet or plate 34 is attached to a convenient external surface of the device H by means of a strong bi-adhesive tape 36 of a type well known in the art. Alternatively, a glue or epoxy is used to bond the ferrous sheet 34. The ferrous sheet 34 also serves to protect the device H during operation. The magnetic field generated by the magnet 18 is contained within the ferrous sheet 34 which thereby prevents the magnetic field from interfering with electronic circuits within the device H.

While the preferred embodiment of the invention has been illustrated and described, it will be appreciated that various changes can be made therein without departing from the spirit and scope of the invention.

What is claimed is:

1. A magnetic mounting platform, comprising:
   a pliant support pad having first and second opposing sides, the first side being formed as a support surface and the second side being formed as a backing surface;
   a magnet;
   a pliant magnet retention structure for retaining the magnet therein, the magnet retention structure comprising an annular ring forming an annular wall with an interior recess being formed within an inner diameter of the annular wall and having an interior depth at least equal to a thickness of the magnet; and
   an interface means formed on the backing surface for mounting the pad on an external mounting surface with the support surface facing away from the external mounting surface, the interface means further comprising a pair of bosses projecting above the backing surface on opposite sides of the annular ring of the magnet retention means, each of the bosses being formed with an aperture extended through the support pad to the support surface thereof.

2. The magnetic mounting platform of claim 1 wherein the support surface further comprises a material having a relatively high coefficient of friction.

3. The magnetic mounting platform of claim 1 wherein the magnet further comprises a rare-earth type permanent magnet.

4. The magnetic mounting platform of claim 1 further comprising a sheet of ferrous material embedded within the support pad.

5. The magnetic mounting platform of claim 1 wherein:
   the magnet retention means further comprises an annular ring forming the interior recess as an inner diameter within an annular wall; and
   the interface means further comprises a pair of ribs projecting above the backing surface and interconnecting each of the bosses with the annular ring.

6. The magnetic mounting platform of claim 1 wherein the pliant support pad is further larger in extent than the magnet retention structure.

7. The magnetic mounting platform of claim 1 wherein the inner diameter within the annular ring is smaller than an outer diameter of the magnet.

8. The magnetic mounting platform of claim 1 wherein the pliant support pad further comprises a pad of elastomeric material that extends beyond the magnet retention structure.

9. A magnetic mounting platform, comprising:
   a thin and pliant support pad having a support surface formed on one side;
   a disk-shaped permanent magnet;
   a magnet retention structure projecting from a backing surface on an other side of the pad opposite from the support surface and retaining the magnet in close proximity to the support surface; and
   an interface structure projecting from the backing surface of the pad and being structured for mounting the pad with the support surface facing away from a mounting surface external to the platform and for capturing the magnet between the support pad and the mounting surface, and a pair of bosses spaced apart on different sides of the magnet retention structure.

10. A magnetic mounting platform, comprising:
   a thin and pliant support pad formed of an elastomeric material and having a support surface formed on one side;
   a disk-shaped permanent magnet;
   a magnet retention structure projecting from a backing surface on an other side of the pad opposite from the support surface and retaining the magnet in close proximity to the support surface; and
   an interface structure projecting from the backing surface of the pad and being structured for mounting the pad with the support surface facing away from a mounting surface external to the platform and for capturing the magnet between the support pad and the mounting surface.

11. The magnetic mounting platform of claim 10 wherein the magnet is a rare-earth permanent magnet.

12. The magnetic mounting platform of claim 10 wherein the elastomeric material of the support pad exhibits a slightly viscous property that results in a relatively high coefficient of friction at the support surface.

13. The magnetic mounting platform of claim 10 wherein the magnet retention structure further comprises an annular ring sized to accept the magnet thereinto under at least light radial pressure against the backing surface and positioned in close proximity to the support surface, the annular ring magnet retention structure being open opposite from the backing surface.

14. The magnetic mounting platform of claim 10, further comprising a portion of magnetically attractive material distinct from the support pad and coupled to an external device to be supported.

15. A magnetic mounting platform, comprising:
  a means for pliantly supporting a magnetically attractive external device, the supporting means comprising a thin and pliant pad of elastomeric material having a support surface formed on one side a backing surface on an other side of the pad opposite from the support surface;
  a means for magnetically attracting an external device to the supporting means;
  a means for interfacing the supporting means to an external mounting surface;
  a means for retaining the magnetic attracting means under radial compression in close proximity to the support surface of the supporting means; and
  wherein the supporting means further comprises both the retaining means and the interfacing means in a single integral component projecting from the backing surface thereof 16. The magnetic mounting platform of claim 15 wherein the magnetically attracting means further comprises a permanent magnet installed in close proximity to the support surface.

17. The magnetic mounting platform of claim 15 wherein the support surface further comprises means for engaging a surface of a magnetically attractive external device with substantially relative non-slipping.

18. The magnetic mounting platform of claim 15 wherein the interfacing means further comprises means for securing the supporting means to an external mounting surface with the support surface facing away from the external mounting surface.

19. The magnetic mounting platform of claim 18 wherein the interfacing means further comprises means for spacing the securing means away from the support surface.

20. The magnetic mounting platform of claim 15 wherein the thin pad of elastomeric material of the supporting means further comprises a portion thereof extended outwardly of the retaining means for the magnetic attracting means.

* * * * *